United States Patent Office 3,072,567
Patented Jan. 8, 1963

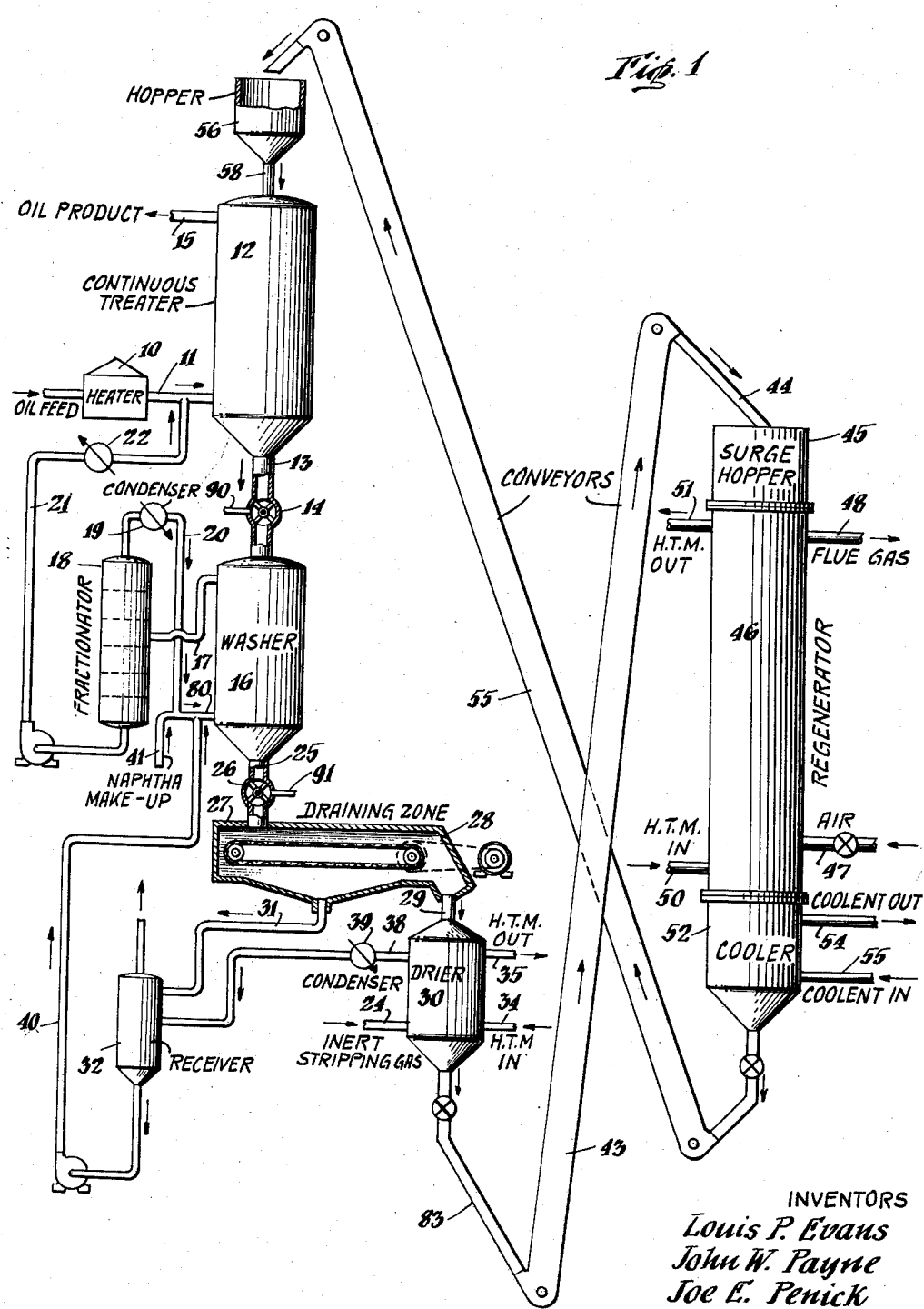

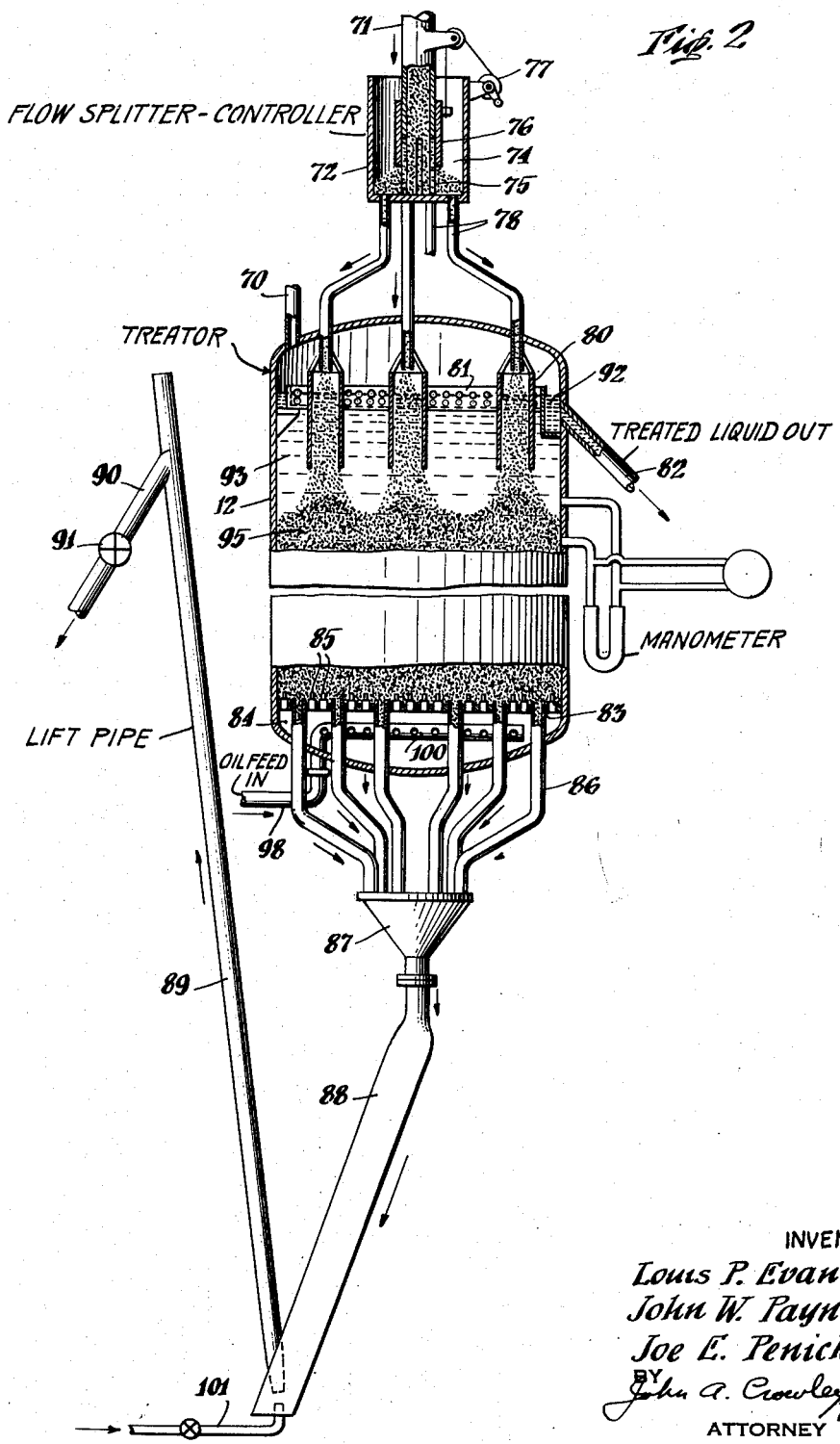

3,072,567
PROCESS FOR CONTINUOUS CONTACTING OF LIQUIDS AND PARTICLE FORM SOLIDS COUNTERCURRENTLY
Louis P. Evans and John W. Payne, Woodbury, N.J., and Joe E. Penick, Barrington, R.I., assignors to Socony Mobil Oil Company, Inc., a corporation of New York
Filed Mar. 11, 1959, Ser. No. 799,387
9 Claims. (Cl. 208—304)

This application is a continuation-in-part of our application Serial Number 723,600, filed in the United States Patent Office on March 24, 1958, now abandoned, which in turn is a continuation-in-part of our application Serial Number 428,694, filed in the United States Patent Office on May 10, 1954, now abandoned, which in turn was a continuation-in-part of our application Serial Number 177,408, filed in the United States Patent Office on August 3, 1950, now United States Patent Number 2,701,786.

This invention relates to a new continuous method for percolating liquids at high throughput rates through beds of particle form adsorbents under conditions permitting an unusually high efficiency and uniformity of liquid-solids contacting. In its broader aspects, this invention is applicable to a large number of different processes involving countercurrent contacting of liquids and solids of palpable particulate form. Exemplary of such processes are adsorptive extractive operations in which liquid components of different composition are separated from mixtures thereof, such as the removal of aromatics from oils by means of silica gel and the treating or treatment of water or other liquids by countercurrent contact with solids. A particularly important application is a process for treating lubricating oils and lighter petroleum fractions of low asphalt content and the like with solid adsorbents for the purpose of removing small amounts of impurities or undesirable contaminants therefrom so as to provide a single purified oil product, as distinguished from extraction and deasphalting processes and the like in which oils are fractionated into two or more liquid products. Typical of the purposes for which the oil may be treated by the method of this invention are decolorization, neutralization, removal of suspended, colloidal or dissolved impurities, such as carbon or coke or oxygen and nitrogen containing impurities and other gum forming compounds, and improvement of demulsibility properties of the oil. A similar application is the continuous percolation of sugar solutions over adsorbents, such as bone char, for the purpose of removing impurities therefrom.

Heretofore, purification processes of the type above mentioned have been conducted commercially by one of two methods: fixed bed percolation or contact filtration. In the fixed bed percolation process, the oil is percolated downwardly through a fixed column of granular adsorbent to effect its treatment. After a period of time, the adsorbent loses its decolorizing or treating effectiveness due to deposition of coky contaminants thereon, and the percolation is stopped, the adsorbent is drained to remove free oil left in the percolation tower, the adsorbent is washed free of adhering oil by means of a solvent, usually naphtha, the solvent is removed by steaming, and, finally, the adsorbent is removed from the percolation vessel and subjected to a burning regeneration at elevated temperatures to render it suitable for reuse. In the contact filtration process, the liquid oil in heated condition is mixed with a measured amount of finely powdered adsorbent, and, after a period of contacting, the oil is filtered from the adsorbent. The adsorbent is then discarded, either with or without solvent washing. Both of these methods have serious disadvantages. In the fixed bed percolation process, the rate of oil throughput per square foot of tower cross-section is extremely low so that a large number of towers occupying a great amount of ground area are required to handle the refinery throughput requirements. Also, the adsorbent gradually undergoes a drop in efficiency due to the burning regeneration, and it is customary to keep the material of different efficiency separate (i.e., first burned, second burned, third burned clay and so on). As a result, there may be as many as 10 to 20 different batches of adsorbent of differing decolorizing efficiency stored in separate bins in a single refinery. Another disadvantage arises from the fact that, because of the inherent nature of the fixed bed percolation systems, it is generally not feasible to conduct the percolation at elevated tempeartures where high treating yields could be obtained. The reason for this is that it would require prohibitively long periods for the percolator to cool down after use for oil percolation to a temperature at which wash naphtha could be introduced. Also, it is often necessary for men to work within the fixed bed percolators when the spent clay is being discharged and atmospheric or only slightly higher temperature levels are, therefore, obviously essential. As a result, the amount of adsorbent per treatment required to decolorize a given quantity of oil is notoriously much greater than in the contact filtration process. Moreover, many heavy stocks of high viscosity can be handled practicably only in a state of solvent dilution in the fixed bed percolation process, so that an expensive solvent recovery step is added to the process. The fixed bed percolation process is often incapable of handling viscous acid treated oils unless such oils have been previously subjected to chemical neutralization. At the low temperatures employed, neutralization is incomplete. Attempts to percolate acid treated stocks which have been neutralized result often in clogging of the adsorbent bed and permanent damage to the adsorbent due to entrainment of the neutralizing liquid into the percolator in the oil being decolorized. In general, the capital investment requirement for a fixed bed percolation process is substantially greater than that for a contact filtration process. On the other hand, the operating cost of the contact filtration is considerably higher, and this is principally due tothe fact that, in the commercial contact filtration process, the adsorbent is thrown away after a single use. The reasons for this are several. Spent contact filtration clays are difficult to regenerate. Attempts to regenerate them by use of solvents have proved unsuccessful in that full regeneration is not usually obtained and in that the cost of this procedure is economically prohibitive. Commercial attempts to regenerate such adsorbents by burning have been unsuccessful because a serious permanent loss in adsorbent decolorizing efficiency is encountered. In addition to this, during the handling, a substantial physical loss of the powdered material is unavoidable. As a result, it usually is customary to discard the spent contact clay after a single use and this poses a double problem of high clay cost for the process and of spent clay disposal. Large mounds of this material may be seen around many refineries. Another disadvantage of the contact filtration process lies in the fact that, since the adsorbent is discarded after use, substantial and costly loss either of adsorbed and occluded oil or of naphtha, if the clay is washed before discarding, is encountered. Still another disadvantage of the contact filtration method lies in the fact that, while the method is capable of handling acid treated stocks to provide a treated oil of low neutralization number, at the same time the demulsibility properties of the resulting treated oil are poor. Both prior art methods characteristically require a considerable amount of handling and man hours per unit of charge oil and consequent high operation costs.

It is also known in the art to contact liquids with moving granular or powdered solids in extraction-type processes. These processes have taken two forms. In one, the liquid is percolated through moving granular solids maintained in essentially compacted condition, each particle resting on the particle therebelow. Processes of this type are characterized by relatively low liquid throughput capacities. In the second type, the solid material is maintained in suspended condition such that each particle is free to move haphazardly in all directions within the column of liquid under treatment. Processes of this type do not provide the high efficiency of adsorbent utilization characteristic of true countercurrent contact of liquids and solids.

A major object of this invention is the provision of a basically new method for countercurrent contacting of liquids and granular solid materials.

A specific object is the provision of a method for continuously percolating liquids through a bed of adsorbent of palpable particulate form under conditions providing an efficiency and uniformity of liquid-solids contact and a capacity of liquid throughput per unit of bed area substantially in excess of that heretofore attained in prior liquid-solids contacting processes.

Another object is to provide an improved and more economical method for decolorizing or purifying lubricating oils, other petroleum oils of low asphalt content and other organic and inorganic liquids with solid adsorbents, which overcomes the above-discussed disadvantages of present commercial processes.

Another object is the provision of an efficient, high capacity continuous percolation process for removing relatively small amounts of impurities or objectionable components from organic or inorganic liquids.

Another object is the provision of an improved continuous percolation process for separating liquid components from mixtures thereof by means of solid adsorbents of palpable particulate form.

Another object is the provision of an improved method for treatment of highly viscous lubricating oils and the like with percolation adsorbents in palpable particulate form without the use of viscosity reducing diluents.

Another object is the provision of an improved and continuous process for decolorizing and purifying lubricating oils of low asphalt content with adsorbents of palpable particulate form.

Another object is the provision of an improved method for washing or treating adsorbent materials of palpable particulate form which have been previously employed for removing impurities from organic or inorganic liquid materials.

These and other objects of this invention will become apparent from the following description of the invention.

In one form, this invention involves a method for contacting liquids and solids wherein an adsorbent of palpable particulate form, as distinguished from powders, is passed downwardly through a confined treating zone as a columnar mass. Liquid which is to be contacted with the adsorbent is passed upwardly through the columnar mass at a superficial velocity sufficient to essentially suspend all of the adsorbent, yet at which substantially all of the particles are confined by non-supporting surrounding particles which prevent escape of the particles from their respective regions of confinement by surrounding particles, whereby essentially all of the particles move consistently and uniformly downwardly through the treating zone in true countercurrent relationship to the liquid. Because the columnar mass is to some extent expanded so that the particles do not rest upon each other, a high rate of liquid flow may be attained without disruption of the columnar mass. Further, the ability to maintain a high rate of liquid flow without disruption of the columnar mass is insured by simultaneously controlling the rate and viscosity of the liquid flow to maintain their product relationship below a maximum value above which the columnar mass would be disrupted.

In a more specific form, this invention involves a process for contacting liquids and subdivided solids in order to bring about a change in the condition of at least one of the materials contacted, wherein the liquid is passed in a confined contacting zone upwardly through a columnar mass of downwardly moving solid particles falling within the diameter range of about 0.0058 to 0.185 inch, and contacted liquid is withdrawn from the upper section of said contacting zone, and contacted solid particles are withdrawn from the lower section of said zone, while the columnar mass is replenished with solid particles introduced into the upper section of said zone. The flow rate and viscosity of the liquid in the contacting zone are controlled to maintain their combined effect on pressure drop in excess of that which first causes a pressure drop per given units of columnar mass height and cross-section, due to liquid passage upwardly through the columnar mass of downwardly moving particles, equal to the difference between the weight of the wetted particles and the weight volume of liquid displaced by the wetted particles per same units of columnar mass height and cross-section, where the pressure drop, columnar mass height and cross-section and weights of oil and solid particles are expressed in consistent units. As a result, substantially all of the particles are essentially suspended in the sense that any such particle is essentially unsupported by surrounding particles. The flow rate and viscosity of the liquid in the contacting zone are further controlled to limit the expansion of said columnar mass to an extent that essentially all of the suspended particles remain surrounded sufficiently closely by other such particles to prevent escape from their regions of confinement by surrounding particles, the volumetric expansion of the columnar mass being limited in any case below about 30 percent of the normally settled volume of the liquid wetted mass. The process of this invention is applicable to solid particles having a loose bulk density within the range of about 0.45 to 1.3 grams per cubic centimeter and to liquids having viscosities in the treating zone within the range of 0.2 to 500 centipoises.

In one preferred form, this invention provides a method for continuous percolation of petroleum oils or other liquids to decolorize or remove small amounts of impurities therefrom at exceptionally high percolation rates and high efficiency of adsorbent utilization without the necessity for contaminating or diluting the oil or other liquid undergoing treatment wtih viscosity cutting solvents. Speaking now in terms of oil without intent to limit the invention thereto, in this method the undiluted oil is caused to pass upwardly through a columnar mass of downwardly gravitating adsorbent particles to effect removal of small amounts of impurities therefrom. Usually, but not always, such impurities are of high molecular weight and of semi-solid organic nature. Purified oil product is withdrawn from the upper section of the columnar mass, while spent adsorbent, along with a certain amount of oil, passes downwardly from the lower section thereof as at least one columnar stream of small cross-section relative to that of the columnar mass. A certain amount of oil passes downwardly from the columnar mass along with the spent adsorbent. The rate of oil passage upwardly through the treating zone and the oil viscosity are controlled to insure a higher liquid throughput capacity than would be obtainable in ordinary gravity percolation of the oil under the same temperature and viscosity conditions through a gravity settled column of the same adsorbent but below that throughput capacity at which the columnar mass would be expanded to the extent of permitting haphazard, random movement of the adsorbent particles in all directions. Under these conditions, the columnar mass is in the limited expanded phase condition described above. When, as is usually the case, solvent dilution of the oil is to be strictly avoided, the viscosity is controlled by control of the temperature of the oil passing through the columnar mass. Also, the weight ratio of oil to adsorbent passage through the treating zone is controlled within the range 0.5 to 50, which has been found to be essential for accomplishing the purpose of oil purification as opposed to subdivision of liquid charge into two or more fractions by adsorptive extraction. While this invention is not limited thereto in all of its aspects, it is usually preferred, in liquid purification processes, to pass the spent adsorbent bearing entrained oil downwardly through a washing zone as a columnar mass while passing a suitable wash solvent upwardly therethrough to recover the entrained oil. The recovered oil is separated from the solvent and at least most of it is recycled to the treating zone. When, on the other hand, the invention is applied to processes involving the separation of the liquid into two or more liquid fractions or to the washing or treating of granular solids, for example, it is usually not necessary and in some cases undesirable to recycle to the treating zone the liquid withdrawn from the treater with the contacted solids.

In conducting this method, the adsorbent employed should be made up of palpable particles of size within the range of about 4 to 100 mesh and preferably about 10 to 60 and still more preferably either 15 to 30 or 30 to 60 mesh by Tyler Screen Analysis. The particles may take the form of pellets, capsules, pills, plates, cubes, spheres or the like or granules of irregular shape such as are obtained from grinding and screening clay-like materials. In some cases, the columnar mass may be made up of particles having a combination of the above-mentioned shapes. The terms "palpable particulate form" or "palpable particle form" as applied to solid materials including adsorbents are employed herein in describing and in claiming this invention with the intention of generically covering solid particles of any or all of these shapes having substantial size as distinguished from finely divided particles.

The pore structure of the preferred adsorbents is such that, while micropores are present, substantially more than 30 percent of the pore volume and preferably more than 60 percent of the total pore volume is occupied by macropores (i.e., pores having radii greater than 100 Angstrom units). Typical adsorbents which may be employed are fuller's earth, bauxite, bentonite and bone char, charcoal, magnesium silicate, heat and acid activated kaolin and activated carbon. Synthetic silica or alumina or silica-alumina gel adsorbents and the like may be employed, but preferably the preparation thereof should be controlled to provide a pore structure similar to that of the clay-type adsorbents wherein substantially more than 30 percent of the total pore volume is occupied by macropores. Gels of this type are described in United States Patent Number 2,188,007, issued January 23, 1940. It should be understood, however, that, by proper control of the operation conditions, adsorbents of the synthetic gel type or otherwise having mostly micropores and less than 30 percent macropores may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patent Numbers 2,384,946 and 2,106,744. The invention in its broadest form is intended to cover adsorbents of this type as well as the preferable adsorbents of larger pore structure. Also, for some applications of this invention, the solid material may be of a relatively non-porous nature, for example, a non-porous refractory material.

The invention may be most readily understood by reference to the drawings, of which FIGURE 1 is a highly diagrammatic elevational view of an arrangement for conducting the method of this invention.

FIGURE 2 is an elevational view, partially in section, of a modified treater arrangement. Both of these drawings are highly diagrammatic in form.

The invention will now be described as applied to the purification of liquid oil feeds, such as a lubricating oil, but it should be understood that this is not to be considered as implying that the invention is limited thereto in its application.

Referring now to FIGURE 1, a liquid oil feed such as a deasphalted petroleum lubricating oil which is substantially free of entrained moisture is passed through a suitable preheater 10 where it is heated to a suitable temperature for adsorbent contacting and is then passed via pipe 11 into the lower section of a columnar mass of adsorbent in granular form, for example, maintained within the continuous treater 12. The oil is caused to flow upwardly through the columnar mass while the adsorbent is caused to flow downwardly by continuous withdrawal of adsorbent from the lower end of the columnar mass via pipe 13 on which is provided a motor-operated measuring valve 14. The rate of oil flow in the column is controlled so as not to seriously interfere with the uniform countercurrent movement of the adsorbent granules relative to the liquid oil. Purified liquid oil product is withdrawn via pipe 15 from the upper section of the vessel 12 after gravity separation from the major portion of the adsorbent within the vessel. If desired, the oil product may be passed through a suitable blotter press to remove from it any traces of adsorbent which may have been entrained in the outlet product stream. The removed adsorbent may be discarded or may be passed to the upper section of washer 16, which is further discussed hereinafter. Spent adsorbent bearing a coky or tar-like contaminant deposit is withdrawn from vessel 12 via pipe 13 as a column of restricted cross-section relative to the cross-section of the column within the treating zone. A limited amount of liquid oil adsorbed in and occluded on the adsorbent and occupying the void spaces between the aggregated granules is entrained from the treating zone in the spent adsorbent outlet stream. It should be understood that the term "entrained oil" as employed herein in describing and claiming this invention is intended to include adsorbed oil, occluded oil, oil filling the void spaces between the particles of adsorbent and any oil passing through the adsorbent mass in the drain stream or streams. The entrained oil is removed from the spent adsorbent by subjecting it to a countercurrent washing with a suitable moisture-free non-polar solvent such as petroleum naphtha free of entrained moisture in the washer 16. The adsorbent flows as a columnar mass downwardly through the washer while the naphtha entering via pipe 80 passes upwardly through the columnar mass. Naphtha and removed liquid oil pass from the upper section of washer 16 via pipe 17 to the fractionator 18 wherein the naphtha is stripped from the oil. The naphtha is removed from the top of the fractionator 18 and, and after being condensed in condenser 19, is recycled to the washer 16 via pipe 20. While not shown in the drawing, it may be desirable to provide a receiver and pump along the pipe 20 so that part of the naphtha may be recycled as reflux to the fractionator. The recovered liquid oil passes from the bottom of fractionator 18 and is pumped through pipe 21 back to the oil inlet to the lower section of the continuous treater. An exchanger 22 may be provided on pipe 21 for adjustment of the temperature of the recycled oil or the oil may be passed through heater 10 along with the original feed. The recovered oil so recycled is usually not substantially different from the original feed in color and like the feed is substantially free of asphalt and entrained moisture. The recycled oil is eventually recovered as purified product in the stream leaving the upper section of the treater via pipe 15, so that there is obtained only a single ultimate liquid oil product from the continuous treater, the only other material which is permanently removed from the treater being adsorbent and a coky contaminant deposited thereon which is not removed from the adsorbent in the washer and which is of such composition as to be unrecoverable as purified oil product. Also, there may be left on the washed adsorbent a small percentage of liquid oil which is not removed by the washing step because, as a practical matter, it is unrecoverable as a purified oil product. The spent adsorbent bearing naphtha and the coky contaminant and sometimes traces of liquid oil flow from the bottom of the washer via pipe 25 at a rate regulated by measuring valve 26 and falls onto a moving screen belt or other type of continuous draining mechanism in draining zone 27. The moving belt passes continuously over spaced rollers and is of mesh size adapted to permit passage of liquid therethrough while retaining the solid adsorbent granules. The latter fall from the end of the belt through a funnel-type passage 28 into pipe 29 feeding a continuous drier 30. The drained naphtha is passed from draining zone 27 via pipe 31 to a receiver 32. If desired, the draining zone may be eliminated and the adsorbent passed directly from the washing zone to the drying zone. The adsorbent passes downwardly through drier 30, wherein it is heated by indirect heat transfer to a temperature suitable for removal of the adsorbed naphtha by vaporization. A suitable heat transfer fluid, such as high pressure steam, molten metal or inorganic salt, is delivered via pipe 34 to heat transfer tubes (not shown) within the drier. The heat transfer fluid is withdrawn from the tubes via pipe 35. The adsorbent may flow through the drier as a columnar mass or it may be maintained as a fluidized body during its passage through the drier. In the latter event, a suitable aerating gas, such as flue gas, nitrogen, superheated steam or, in some cases, air, is introduced via pipe 24 near the bottom of the drier and passed upwardly therethrough at a rate sufficient to maintain the adsorbent as a fluidized or boiling bed. In this case, there is no true countercurrent flow of solids and fluid as there is in the treating zone because of the free columnar movement of the granules in the fluidized bed. The aerating gas which also aids in stripping the naphtha from the adsorbent is withdrawn along with naphtha via pipe 38 and passes through condenser 39 to receiver 32. Non-condensed gas is withdrawn from the top of the receiver and recovered naphtha is pumped from receiver 32 via pipes 40 and 80 back to the washer. Any make-up naphtha required in the washer is introduced via pipe 41. In some operations, the naphtha recovered in receiver 32 may be withdrawn from the system and used for other purposes. In this case, it is replaced with fresh naphtha continuously supplied to the washer via conduit 41. The gas withdrawn from receiver 32 may be recycled to the drier if desired. When steam is employed within the drier, water is removed from receiver 32 via pipe 100. Adsorbent bearing all of the material removed from the oil in the treater except that recovered in the washer is withdrawn from drier 30 in substantially dry, moisture-free form and passed through pipe 83 to conveyor 43, by which it is conducted to a point from which it may flow via duct 44 to a regenerator surge hopper 45. The conveyor may take the form of a conventional bucket elevator, a belt conveyor or a pneumatic conveyor. Granular adsorbent passes downwardly as a substantially compact column through the regenerator 46 and is contacted therein with an oxygen-containing gas such as air introduced via pipe 47. Resulting flue gas is withdrawn from the kiln via pipe 48. The adsorbent temperature is maintained at a level sufficiently high to effect the required removal of the contaminant, i.e., down to about 0.5 to 2.5 percent by weight measured as carbon or less, but below a heat damaging level at which the adsorbent would be sintered or would suffer permanent damage in its decolorizing efficiency. The temperature control may be effected by removing excess heat from the kiln by means of a suitable heat exchange fluid supplied via pipe 50 to heat transfer tubes (not shown) within the kiln and withdrawn therefrom via pipe 51. Examples of suitable fluids for this purpose are low melting point metallic alloys, mixtures of inorganic salts such as nitrates and nitrites of sodium and potassium, steam, or other gases. Regenerated moisture-free adsorbent passes through a cooler 52 wherein it is cooled by indirect heat transfer to about the desired oil treating temperature. Heat exchange fluid enters tubes (not shown) within cooler 52 via pipe 53 and leaves the tubes via pipe 54. Examples of heat exchange fluids useful for this purpose are water, low melting point alloys, or inorganic salt mixtures, steam, air, or the lubricating oil feed prior to its charge to the treating zone. The adsorbent after cooling is transferred by conveyor 55 to a supply hopper 56 located above the treater. The moisture-free adsorbent then flows by gravity through pipe 53 onto the upper end of the column maintained within the treater so as to maintain its surface level substantially constant.

In the operation of star valves 14 and 26, there is a tendency for some gas to be forced by the valves into the portions of pipes 13 and 25 above the valves. If desired, in order to prevent this, each of the valves 14 and 26 may be driven in such a manner that there is a pause in its rotation as each material receiving pocket comes in line with the pipe 13 or 25. During the pause in rotation, gas carried in the pocket which will next receive material from the treater may be removed by evacuation via pipes 90 and 91. By this procedure, the pumping of gas up into the treater 12 and washer 16 by the valves 14 and 26, respectively, is avoided. It will be understood that other suitable means known to the art may be substituted for the star valve arrangements for controlling the flow of spent adsorbent from the treater 12 and of washed adsorbent from washer 16.

It is contemplated that, within the broad scope of this invention, the arrangement of the apparatus and the design thereof may be modified somewhat from that specifically described hereinabove. For example, while the recovery of entrained oil from the adsorbent by means of solvent washing followed by adsorbent drying is the preferred form of the invention, it is also contemplated that, in some operations, the washing and drying steps may be eliminated, and, instead, the oil may be recovered by heating the adsorbent and stripping it with a suitable gas, for example, flue gas or hot naphtha vapors. In any event, care should be taken that the recycle oil is not seriously damaged or converted in the recovery step. It is also contemplated that the washing step may be conducted in other ways, for example, the spent adsorbent may be delivered onto a perforated moving belt while a wash solvent is sprayed onto it. If desired, the adsorbent may be drained prior to the washing step as well as subsequent thereto. Instead of moving belt drainers, continuous filters or centrifuges may be employed. The drier also may be modified, for example, the heat transfer tubes may be omitted and the heat for the drying supplied simply by passing preheated flue gas or other suitable inert gas upwardly through the adsorbent mass. Also, instead of the drier shown, belt or tunnel driers properly adapted for recovery of the naphtha may be employed. We prefer to employ as the regenerator a kiln of the type described in United States Patents 2,226,535 or 2,226,578, issued December 31, 1940. However, it is contemplated that other known kiln constructions either of the multi-stage or single stage types may be employed, provided the adsorbent temperature is properly controlled during its regeneration. A suitable regeneration system which may be employed is described in United States Patent Number 2,506,545. In some arrangements, the kiln temperature control and the adsorbent cooling step after the regeneration may be accomplished by passing a suitable heat exchange gas directly through the adsorbent mass so as to provide direct heat transfer rather than indirect heat transfer through tubes. Examples of suitable heat exchange gases for this purpose are air, flue gas, hydrogen or methane.

Turning now to FIGURE 2, there are shown some of the internal details of the treater and modified adsorbent feed and drain arrangements. The treater 12 is vented to the atmosphere through vent 70 in its top. Above the treater, there is provided a single adsorbent feed conduit 71, which extends down from a surge or supply hopper (not shown) to the bottom of receptacle 72. Since receptacle 72 is of substantially greater diameter than conduit 71, an annular space 74 is provided for receiving adsorbent issuing from vertical slots 75 along the lower end of conduit 71. A slideable sleeve 76 operated by cable and crank 77 is provided to permit adjustment of the amount of slot area open for adsorbent escape from conduit 71. A plurality of pipes 78 extend downwardly from the bottom of receptacle 72 for transfer of adsorbent into the upper ends of the vertical wetting tubes 80 located in the upper section of the treater. The adsorbent flow control and divider arrangement above described is shown in United States Patent Number 2,745,795. The tubes 80, which are of substantially greater diameter than pipes 78, are open on both ends and terminate on their lower ends at a common level in the upper section of the treater which is substantially below the level of the oil collector channel 81 and outlet pipe 82. The collector channel 81 is described in United States Patent Number 2,758,070.

A horizontal partition 83 extends across the lower section of treater 12 above the bottom thereof so as to provide a plenum or liquid distribution space 84. A plurality of uniformly spaced nozzles 85 are distributed uniformly across the partition for passage of liquid from space 84 into the columnar mass of adsorbent thereabove. The liquid distribution and nozzle arrangements are described in United States Patents 2,773,012 and 2,772,780. A plurality of uniformly spaced adsorbent drain pipes 86 depend from partition 83 and terminate a substantial distance below the treater in a flow combining funnel 87. The withdrawal system and combining funnel are shown and claimed in United States Patent 2,904,506, issued September 15, 1959. A conduit 88, closed on its lower end, extends downwardly from the funnel 87 to a location a substantial distance therebelow. A smaller lift pipe 89 extends upwardly from a point within the lower section of the conduit 88 to a level above that of the treater liquid outlet 82. A slurry outlet pipe 90 with throttle valve 91 thereon is provided at an intermediate point along lift pipe 89 for withdrawal of slurry. Certain aspects of the adsorbent withdrawal system shown in FIGURE 2 are further described and claimed in United States Patent Number 2,783,189 and United States Patent 2,925,-382, issued February 26, 1957, and February 6, 1960, respectively.

In operation, adsorbent from the flow control box 72 falls through pipes 78 into the upper ends of tubes 80 through which it falls freely into the liquid oil which seeks its level within the tubes 80. The adsorbent is degasified and wetted in tubes 80 and drops freely onto the surface of the columnar mass 95, which is maintained about 6 to 18 inches below the lower ends of tubes 80. The details of construction and operation of the adsorbent degassing and wetting system are shown in United States Patent Number 2,749,290. Treated oil is collected in trough 81 and flows from trap 92 to the outlet pipe 82. It will be noted that a liquid oil body 93 is maintained above the columnar mass 95, the surface of the oil body being located about 18 to 36 inches above the lower ends of tubes 80. A very definite, well defined interphase exists between the columnar mass 95 and the liquid body 93. The location of this interphase may be measured and indicated by any of a number of suitable devices, such as the differential pressure manometer 96 shown in the drawing. An indicating device of this kind is the subject of claims in United States Patent Number 2,850,438. Oil to be purified enters the treater via pipe 98 and perforated header 100 and then is uniformly distributed by nozzles 85 into the lower section of the columnar mass. The rate of oil flow and the oil viscosity are controlled so as to permit a superficial velocity which is substantially higher than that attained in fixed bed percolation processes, while substantial disruption of the columnar mass is avoided. Spent adsorbent flows downwardly through pipes 86 from the bottom of the columnar mass 95 as columnar streams. These streams have a total cross-section amounting to only a small fraction of that of the columnar mass, i.e., broadly less than 10 percent and preferably less than 1 percent of that of the columnar mass. As a result, they serve to restrict the amount of oil which flows downwardly through the conduits 86 along with the adsorbent. The columnar adsorbent drain streams combine in funnel 87 to form a single columnar drain stream 88. The sizing and arrangement of pipe 89 is such that the adsorbent drain stream will not rise therethrough at the desired total adsorbent circulation rate without injection of a lift oil via nozzle 101 adjacent the lower end of pipe 89. The amount of oil injected through nozzle 101 is controlled to provide the desired adsorbent drain rate but is limited below that which would prevent flow of some oil from the treater 12 downwardly through the columnar drain stream flowing in pipes 86 and conduit 88. Thus, there is provided a positive flow of oil through the entire drain system concurrent with the adsorbent flow. This avoids stream stoppage due to wet slurry bridging in both the downflow and the upflow passages of the drain system. This adsorbent drain method differs markedly from prior art arrangements in which the adsorbent leaving the treating zone is caused to drop through a stationary or upwardly flowing column of naphtha maintained in the drain system. In arrangements of the latter type, dilution of the oil undergoing treatment with the seal solvent usually occurs. In the method described hereinabove, such dilution of the oil is entirely avoided, and the flow of adsorbent downwardly from the treating zone is assisted rather than hindered by liquid flow. In addition, by proper restriction of the size of the drain streams, excessive escape of oil therethrough may be avoided. The operation conditions to be maintained in the several steps of the cyclic process of this invention vary somewhat, depending upon the particular adsorbent and oil feed involved and the particular purpose of the treatment. In these preferred aspects of this invention wherein it deals with the removal of small amounts of impurities from oils, for example, decolorization, neutralization and the removal of gum-forming compounds, the volumetric ratio of liquid oil measured at 60° F. to adsorbent (packed bulk density) falls within the range of about 0.3 to 30. The method for determining bulk packed density of granular adsorbents is disclosed in an article entitled "Macropore Size Distribution in Some Typical Porous Substances," by L. C. Drake and H. L. Ritter, Industrial Engineering Chemistry, Analytical Edition, volume 17, Number 12, pages 787–91, 1945. In general, this method involves pouring the adsorbent sample into a graduated container, tapping or agitating the container until the adsorbent reaches constant volume, then measuring the volume and weighing the sample. On the weight basis, the above-mentioned range is intended to cover oil to adsorbent throughput weight ratios ranging from about 0.5 to 50. In preferred operations according to this invention, the oil to adsorbent throughput weight ratio falls within the range 1.0 to 30.

The method of this invention offers the advantages of high liquid throughput capacity or high rates of liquid flow relative to the contacted solid particles. It also provides highly efficient utiltzation of the solid material. This means, in an oil treating process, for example, high yields of treated oil per unit weight of adsorbent throughput. It has been found possible, by the method of this invention, to provide liquid throughput capacities substantially higher than those obtained in fixed bed gravity percolation processes without loss and, in fact, with increase in treating efficiency. This is attained by simultaneous control of the oil or other liquid viscosity and superficial velocity as it passes through the treating or contacting zone to effect a mild volumetric expansion of the column of wetted adsorbent or other solid contact material due to the liquid flow so that substantially all of the adsorbent particles are essentially suspended in the upflowing liquid stream. The particles may, to some extent, touch each other, but they do not support each other to any substantial extent and are essentially free to vibrate within a very restricted region or orbit confined by surrounding particles of adsorbent. Nevertheless, while the particles are so suspended, the amount of expansion of the columnar mass is so limited that essentially all of the particles (i.e., at least 90 percent and usually 95 percent of them, the remainder being undersized fines) are surrounded by other particles to such an extent that they are not free to wander out between surrounding particles from their regions of confinement. In other words, there is insufficient room between surrounding suspended particles to permit any given particle to move out between surrounding particles. Hence, the direction of movement of the particles in the columnar mass within the treating zone is consistently and continuously downward, whereby true and highly efficient countercurrent contacting of the liquid and the adsorbent particles is attained. This is to be contrasted with the irregular and haphazard type of contacting attained in systems in which haphazardly migrating adsorbent particles eventually move in a net downward direction through a fluidized or agitated bed while a liquid is passed upwardly therethrough. While, in systems of this latter type, high rates of liquid throughput are sometimes attained, the high contact efficiencies attainable only by true countercurrent contacting are, of course, not provided. It has been found that, in order to avoid the haphazard particle diffusion characteristic of fluidized beds, it is important to control the liquid superficial velocity and viscosity relationship, i.e., their product, below that which would result in a volumetric expansion of the columnar mass due to liquid flow in excess of about 25 to 30 percent of its normally non-agitated volume as settled in a static body of the liquid. For granular shaped solid particles, this limit may be expressed in terms of controlling the superficial velocity and viscosity of the liquid passing upwardly through the columnar mass to maintain their product, ZU, always less than the value:

$$250{,}000 \, D^2 \left(\frac{S_a}{1-F}\right)\left(1-\frac{S_L}{S_T}\right) - V_s F Z \quad (1)$$

where U is the superficial velocity of the liquid through the portion of the contacting zone occupied by the columnar mass in feet per hour (calculated on the basis of the total cross-section of the zone when empty of solid particles), Z is the viscosity of the liquid in centipoises under the conditions within the contacting zone and within the range about 2.5 to 560 centipoises, D is the average particle diameter in inches (calculated by averaging the reciprocal of the particle diameters) and within the range 0.0058 to 0.185 inch, $S_a$ is the apparent density of the loose-packed solid material in grams per cubic centimeter (conveniently determined by pouring a sample of the solids into a graduated container without agitation of the container and then weighing a measured amount) and within the range 0.45 to 1.3 grams per cubic centimeter, $S_T$ is the true density of the solid material or adsorbent in grams per cubic centimeter, $S_L$ is the density of the liquid under the conditions in the contacting zone in grams per cubic centimeter, F is the fraction of voids between the solid particles under the same conditions at which the apparent density is determined and within the range 0.42 to 0.49, and $V_S$ is the superficial velocity of the solid material through the contacting zone measured at apparent density $S_a$ in feet per hour. This relationship applies to particles of granular form. For spherical particles, the numerical constant in the relationship will be approximately 10 to 30 percent higher. As the particles approach relatively flat plates in shape, the numerical constant will be about 10 to 30 percent lower.

The method of this invention offers high liquid throughput capacity with highly efficient utilization of the contact material, i.e., high yields of treated liquid per unit weight of adsorbent throughput. In general, the selected superficial velocity will depend upon the density and viscosity of the liquid and the density, particle size and other properties of the contact material as well as the adsorbent velocity. In general, this superficial velocity will be within the range of about 0.5 to several hundred and upwards feet per hour and will generally be above 1.5 and more often above about 3 feet per hour. In processes involving removal of small amounts of impurities from liquid such as oils having viscosities above about 1 to 2 centipoises under conditions in the treating zone by contacting with solid adsorbents falling within the range about 0.0058 to 0.185 inch diameter, and about 30 to 75 pounds per cubic foot apparent loose-packed density, the superficial velocity of the liquid passing upwardly through the treating zone is maintained at a practical rate within the range about 0.5 to 20 feet per hour and preferably within the range 1 to 10 feet per hour (based on oil treating temperature and free cross-sectional area of the treater when empty). Usually for adsorbents made up of particles falling somewhere within the range 15 to 60 mesh, it is preferred to maintain the superficial velocity within the range about 1.5 to 8 feet per hour. Much higher velocities than those above specified may be employed for liquids of substantially lower viscosities.

As regards the liquid viscosity, by way of example, it may be stated that for granular adsorbent within the range 4 to 100 mesh (Tyler scale), the range of oil viscosities required in the treating zone should fall within the range about 0.2 to 500 centipoises. For an oil superficial velocity in the treating zone of the order of about 4 feet per hour and for granular adsorbent of the type of fuller's earth (approximately 35 pounds per cubic foot apparent density as poured dry into a container without packing) falling within the size ranges 4 to 14, 14 to 28, 28 to 60 and 60 to 100 mesh (Tyler scale), the flowing oil viscosity in the treater should be maintained preferably below about 560, 50, 10 and 2.5 centipoises, respectively. For 28 to 60 mesh material under the above conditions, an oil viscosity of about 5 centipoises has been found to be highly satisfactory.

This invention is to be distinguished from operations in which the adsorbent column is maintained as a compact bed, the particles resting upon and depending upon each other for support. In such systems, the high liquid throughput capacities characteristic of the method of this invention are not attainable. This is particularly important when the contacting operation involves liquids of relatively high viscosity, i.e., above 1 to 2 centipoises under the contacting conditions and usually above 5 centipoises at 70° F. It has been found that, if the superficial velocity and/or viscosity of a liquid stream passing upwardly through a compact bed of adsorbent of palpable particulate form are gradually increased, the bed begins to lose its compacted condition and to assume the mildly expanded condition described hereinabove when the product relationship or combined influence of the stream viscosity and velocity on pressure drop first exceeds that which causes a pressure drop in given units, for example, in pounds per square foot per unit of columnar mass height (per foot) due to the liquid flow $$\left(\frac{\Delta P}{L}\right)$$

equal to the difference between the weight of the wetted solids and the weight of the volume of liquid displaced by the wetted solids in the same units (pounds per square foot) per unit (foot) of columnar mass height. It will be noted that the volume of liquid displaced by the wetted solids is equal to $(1-F)$, where F is the fraction of voids between particles under conditions at which the apparent density of the loose-packed solids ($S_a$) is measured.

In general, Equation 1, which defines the upper border of this invention, is considered accurate for the viscous flow of the contacting liquids through the columnar mass of the contacted solid material, i.e., when the Reynolds Number, $Re_M$, is less than 10, i.e., $$Re_M = \frac{DU \phi_S S_L}{Z(1-F)} < 10$$

where the factors in the equation are the same as defined hereinabove and $\phi_S$ is the shape factor for the solid particles. The shape factor is equal to 1.0 for particles of spherical shape, about 0.68 to 0.78 for granular particles and 0.45 to 0.74 for plate shaped particles having $T/D$ ratios of 0.1 to 0.4, respectively (where T is thickness and D is diameter or average width of the particle). Particles of other shapes fall between these values, for example, the shape factors for oblate spheriods range from 0.70 to 0.78, for cubes—0.83, for bone char—0.55 to 0.60, for pellets having length to diameter ratios of 1 and 3—0.88 and 0.78, respectively, and for capsules having length to diameter ratios of 3 and 10—0.78 and 0.59, respectively. Shape factors for various solid particles may be found in the published literature. In those unusual applications of the invention in which the value of $Re_M$ exceeds 10, the real limits of ZU may differ somewhat from those determined by Equation 1. In those instances, the proper limiting ZU values may best be determined by experimental observation of condition of the columnar mass, keeping in mind the distinguishing characteristics of the mildly expanded phase discussed herein as as value of ZU approaches the minimum or maximum limits.

In accordance with the broader aspects of this invention, the viscosity of the liquid in the contacting zone may be controlled either by dilution of the liquid with a miscible, low viscosity cutting agent or by control of temperature in the contacting zone. Thus, in an oil purification process, the oil may be diluted, if necesary, with a non-polar solvent such as a paraffinic naphtha or carbon tetrachloride. In a preferred form of this invention, particularly wherein it deals with treatment of oils or other liquids to remove small amounts of impurities therefrom, it has been found highly advantageous to control the oil viscosity exclusively by temperature. This eliminates solvent dilution of the oil being treated, greatly increases the volumetric oil throughput capacity of the treater and avoids the necessity of subjecting the treated oil to distillation for the purpose of removing solvents. This is a method of operation not practicably possible in batch-type percolation processes. By virtue of the continuous nature of the process of this invention, it becomes possible to control the temperatures throughout the decolorizing percolator at fixed desirable levels for sustained periods of operation. In general, the treating temperature may fall within the range atmospheric to 700° F., but generally the treating temperature should be maintained above about 150° F. and below the flash point of the oil as measured by the ASTM Cleveland Open Cup Method. It has been found that somewhat higher temperatures are often required to effect proper neutralization of acid treated stocks than for decolorization treatments. In any case, the conditions of temperature and pressure in the percolator should be maintained such that there is no appreciable vaporization of the oil in the treating zone. The pressure in the treater is usually maintained near atmospheric pressure.

The vertical length of the columnar mass of solid material within the contacting zone depends, of course, on the purpose of the contacting. As an example, in the purification of oils by removing small amounts of impurities with adsorbents, the vertical length of the columnar mass should be 5 feet or more and should preferably be within the range about 10 to 50 feet.

In another example, when the method of the invention is applied to the washing of used adsorbent from an oil decolorizing process, the height of the adsorbent column in the washing zone of the type shown in FIGURE 1 should be within the range about 5 to 20 feet. In the washing operation, any suitable non-polar solvent may be employed which boils substantially below the oil treated and at a sufficiently low temperature to permit recovery of the oil therefrom in undamaged form. Typical of solvents which may be employed are carbon tetrachloride, normal heptane, normal octane, petroleum naphtha boiling within the range 100 to 400° F. and carbon disulfide. We prefer to employ a paraffinic naphtha boiling within the range about 210 to 300° F. The washing step may be conducted at atmospheric pressure or at higher or lower pressures and at any temperature below that at which substantial vaporization of the solvent occurs, for example, 60 to 250° F. in the case of the preferred naphtha wash medium. It has been found that the volumetric ratio of naphtha to adsorbent charged to a washer of the type shown in the drawing may be within the range 0.6 to 3.0 and preferably 0.8 to 1.5. The naphtha superficial velocity through the washer should be of the order of 1 to 30 feet per hour.

In the drying zone discussed in connection with FIGURE 1, the pressure is preferably near atmospheric. The temperature to which the adsorbent need be heated depends upon the boiling range of the washing solvent and the amount of stripping vapor employed in the drying zone. The linear velocity of added gas flow in the drier may vary from nothing at all where the adsorbent is maintained as a compact bed to a velocity of the order of 0.2 to 10 feet per second, depending upon adsorbent particle size and density where the adsorbent is maintained as a fluidized bed.

The regeneration zone may be operated at pressures ranging from 0 to 100 pounds per square inch gauge, low pressures being preferred. The temperature in the regeneration zone should be controlled at all times above a minimum required for contaminant combustion at a practicable rate, which minimum depends upon the nature of the deposit and the stage of its removal. In order to accomplish a proper regeneration of the adsorbent, its temperature should be maintained above 900° F. during the later portion of the regeneration. Also, the temperature of the adsorbent should be controlled below a heat damaging level. The heat damaging level varies, depending upon the type of adsorbent involved, being of the order of about 1,200° F. for clays of the fuller's earth type and of the order of 1,400° F. for bauxite.

In processes for removing small amounts of impurities from liquid feeds by continuous percolation of liquid through a downwardly moving columnar mass of adsorbent, whereby a single liquid product is obtained, it is important to recycle to the treating zone the liquid which has been removed from the treating zone along with the spent adsorbent. It is further important in such a process to control the weight ratio of oil to adsorbent throughput within the range about 0.5 to 50. A continuous percolation process involving the last-named features is the subject of claims in United States Patent Number 2,701,786. The application of the method of the present invention to processes of the above type permits greatly increased liquid throughput capacities and improved utilization of the adsorbent over what is obtainable when the columnar mass of downwardly moving adsorbent is maintained in compacted condition. When the invention is employed for such process purposes, it is, of course, desirable to control the ratio of oil to adsorbent throughput within the above-mentioned range and to recycle to the treater substantially all of the liquid recovered from the spent adsorbent withdrawn from the treating zone. On the other hand, it will be understood that, when the invention is applied to other processes, such as an adsorbent washing process or a process for separating aromatics and paraffinic hydrocarbons from a feed containing a mixture of the same, the above-mentioned oil to adsorbent ratios do not necessarily apply; and the recycling of the liquid removed with the adsorbent is unnecessary and, in some cases, undesirable. In the case of a process for separating aromatics from paraffinic hydrocarbons, liquid to adsorbent weight ratios less than 0.5 are usually preferred.

By way of example of the application of the method of this invention, Table I hereinbelow lists the operating results, yields and conditions maintained in the several steps of a process for the decolorization of a solvent-treated Mid-Continent bright stock and a process for effecting the neutralization and decolorization of a sour, sulfuric acid-treated Coastal distillate. The table also lists properties of the charge oils and of the oil products obtained from the treating zone. The adsorbent employed in these examples was a 28–60 mesh fuller's earth having a loose apparent density of about 0.523 gram per cubic centimeter, fraction of voids about 0.44, average particle diameter about 0.0158 inch and true density of about 2.66 grams per cubic centimeter. The shape factor for the granular adsorbent was about 0.75.

*Table I*

| | A | B |
|---|---|---|
| Charge stock | Solvent refined Mid-Continent bright stock | Sour acid treated Coastal distillate |
| Adsorbent | Fuller's earth 28–60 Mesh (Tyler scale) | Fuller's earth 28–60 Mesh (Tyler scale) |
| Treating zone: | | |
| Temp., °F | 300 | 375. |
| Press., p.s.i.g | 0 | 0. |
| Actual oil contact time of oil with adsorbent (hrs.) | 2.5 | 1.7. |
| Oil velocity in bed, cu. ft./sq. ft./sec. | 0.0011 | 0.0016. |
| Ads. vel., ft./sec | 0.00014 | 0.00081. |
| Bed depth, ft | 10 | 10. |
| Oil on clay leaving treater, vol./vol. of clay charge | 1.05 | 1.10. |
| Recycle oil, vol./vol. fresh charge | 0.245 | 1.29 |
| Oil viscosity in treating zone, centipoises | 5.0 | 3.9. |
| Diluent in oil feed | None | None. |
| Oil product yield, #/# ads. charge | 6.8 | 1.3. |
| Washing zone: | | |
| Temp., °F | 130 | 130. |
| Press., p.s.i.g | 0 | 0. |
| Wash solvent | Paraffinic naphtha E.P. 300° F. | Paraffinic naphtha E.P. 300° F. |
| Solvent feed, #/# of adsorbent | 1.7 | 1.7. |
| Bed depth, ft | 10 | 10. |
| Drying zone: | | |
| Temp., °F | 400 | 400. |
| Press., p.s.i.g | 1.3 | 1.3. |
| Bed depth, ft | 6 | 6. |
| Stripping gas | Flue gas | Flue gas. |
| Regeneration zone: | | |
| Max. temp., °F | 1,150 | 1,150. |
| Press., p.s.i.g | 1 | 1. |
| Regeneration gas | Air | Air. |
| Bed depth, ft | 20 | 20. |
| Weight percent C. deposit on entering dried clay | 5.7 | 7.3. |
| Weight percent C. deposit on regenerated clay | 2.0 max | 2.0 max. |
| Cooling zone: | | |
| Temp., clay entering, °F | 1,000 | 1,000. |
| Temp., clay leaving, °F | 360 | 385. |
| Press., p.s.i.g | 1 | 1. |

| Oil properties | Chg. | Prod. | Chg. | Prod. |
|---|---|---|---|---|
| A.P.I. gravity | 27.1 | 27.2 | 20.5 | 21.7 |
| SUV at 210° F | 102.6 | 98.3 | 172.7 | 140.9 |
| Viscosity index | 93 | 95 | 53 | 54 |
| Flash, open cup | 310 | 100 | | |
| Color, ASTM | | | Black | 5+ |
| Neutralization number | 0.01 | Nil | 5.7 | 0.02 |
| ASTM steam | | | 1,200+ | 35 |
| Emulsion number: Conradson carbon residue | 0.4 | 0.3 | 0.9 | 0.6 |
| Flash point, °F | 495 | 490 | 535 | 505 |
| Yields: | | | | |
| Oil prod. percent weight of fresh oil chg | | 99.0 | | 93.4 |
| Coky material burned in regen. percent weight of clay-coke chg | | 3.6 | | 5.4 |
| Coke burned, percent weight fresh oil chg. (calculated as carbon) | | 0.5 | | 4.2 |

In the above operations, oil entrained in the adsorbent leaving the treating zone was substantially entirely recovered from the adsorbent and returned to the freezing zone as recycle oil. This oil was ultimately withdrawn from the upper section of the treating zone as part of the oil product so that there was only one liquid oil product ultimately obtained from the treating zone. Other than small handling losses, the only constituents of the original asphalt-free oil feed which were not contained in the single oil product were coky or tarry carbonaceous material deposited on the dried adsorbent entering the regeneration zone and a small amount of oil which was not removed from the clay in the washing step. The recycle oil recovered from the spent adsorbent by draining and washing was substantially free of asphalt and of properties similar to or superior to those of the original charge oil. For example, in the above Example A, the Lovibond color of the original feed and of the recycle oil was 310 and 270, respectively; and the Conradson carbon residues of the feed and recycle were 0.4 and 0.3, respectively. In the case of Example B, the ASTM colors of the oil feed and recycle were black and 7, respectively, and Conradson carbon residues of the feed and recycle were 0.9 and 0.6, respectively. In the above operations, by exclusion of condensed steam or water from contact with the adsorbent, the adsorbent suffered no substantial loss in its treating efficiency. An adsorbent handling loss of up to about 2 percent per cycle occurs, and fresh adsorbent may be added in this amount either continuously or at intervals.

The advantages of a treating process conducted in accordance with the method of this invention over those of the prior art will be apparent from a study of Tables II and III. The data in Table II compare the continuous percolation process conducted with the adsorbent column maintained in semi-expanded condition in accordance with this invention with a conventional prior art fixed bed percolation process and with a conventional prior art contact filtration process as applied to the decolorization of a solvent-treated Mid-Continent petroleum bright stock. The data in Table III compare the same three processes as applied to treatment of a sour Coastal distillate which has been treated with sulfuric acid.

*Table II*

| Process | Continuous percolation | Fixed bed percolation | Contact filtration |
|---|---|---|---|
| Adsorbent | Fuller's earth 28–60 mesh (Tyler scale) | Fuller's earth 28–60 mesh (Tyler scale) | Superfiltrol (powdered) |
| Operating conditions in treating zone: | | | |
| Temperature, °F | 300 | 130 | 500 |
| Pressure, p.s.i.g | 0 | 0 | |
| Oil contact time, hrs | 2.5 | 9.7 | 0.5 |
| Bed depth, ft | 10 | 24 | |
| Percent diluent in oil feed | 0.0 | 100.0 | 0.0 |
| Volume oil product per hr. per volume of treater | 0.20 | 0.025 | 0.85 |
| Other operating data: | | | |
| Naphtha wash to recover entrained oil | Yes | Yes | No |
| Clay regeneration and reuse | Yes | Yes | No |
| Wash naphtha used, #/# adsorbent | 1.7 | 1.2 | 0.0 |
| Naphtha recovery heat load Btu/# oil feed to treater | 26 | 278 | 0.0 |
| Yield of 100 Lovibond color finished oil product, #/# adsorbent per pass | 6.8 | 3.9 | 9.4 |
| New adsorbent makeup, # adsorbent per 100 # oil product | 0.29 | 2.6 | 10.7 |
| Yield oil product percent weight of feed | 99.0 | 97.1 | 93.5 |
| Net loss of potential product oil, percent weight of fresh feed | 0.14 | 0.50 | 6.5 |

Table II—Continued

| Process | Continuous percolation | Fixed bed percolation | Contact filtration | Charge stock |
|---|---|---|---|---|
| Adsorbent | Fuller's earth 28-60 mesh (Tyler scale) | Fuller's earth 28-60 mesh (Tyler scale) | Super filtrol (powdered) | |
| Oil properties, product: | | | | |
| Gravity, seconds A.P.I. | 27.2 | 27.3 | 27.2 | 27.1 |
| SUV at 210° F | 98.3 | 98.5 | 99.3 | 102.6 |
| Viscosity index | 95 | 94 | 94 | 93 |
| Color Lovibond | 100 | 100 | 98 | 310 |
| Carbon residue | 0.28 | 0.30 | | 0.4 |

Table III

| Process | Continuous percolation | | Fixed bed percolation | Contact filtration | |
|---|---|---|---|---|---|
| Adsorbent | Fuller's earth 28-60 mesh (Tyler scale) | | Fuller's earth 28-60 mesh (Tyler scale) | Super filtrol (powdered) | |
| Operating conditions in treating zone: | | | | | |
| Temperature, ° F | 350 | 375 | 130 | 600 | |
| Pressure, p.s.i.g. | 0 | 0 | 0 | 0.17 | |
| Oil clay contact time, hr | 1.9 | 1.7 | 12.3 | 0.17 | |
| Bed depth, ft | 10.0 | 10.0 | 24.0 | | |
| Percent diluent in oil feed | 0 | 0 | 100 | 0 | |
| Volume oil product per hr. per volume of treater | 0.2 | 0.2 | 0.020 | 0.71 | |
| Other operating data: | | | | | |
| Naphtha wash to recover entrained oil | Yes | Yes | Yes | No | |
| Clay regeneration and reuse | Yes | Yes | Yes | No | |
| Wash naphtha used, #/# adsorbent | 1.7 | 1.7 | 1.2 | 0.0 | |
| NH₃ neut. of oil prior to percolation | No | No | Yes | No | |
| Naphtha recovery, heat load B.t.u./# oil feed to reactor | 26 | 26 | 278 | | |
| Yield 100 Lovibond (500 amber series): Color finished oil product #/#, adsorbent per pass | 1.2 | 1.2 | 0.9 | 4.3 | |
| New adsorbent make-up # adsorbent per 100 oil product | 1.6 | 1.5 | 11.1 | 23.1 | |
| Yield oil product percent weight of fresh feed | 93.4 | 93.4 | 91.3 | 86.4 | |
| Net loss of potential product oil percent weight of fresh feed | 0.7 | 0.7 | 2.0 | 7.0 | |
| | | | | | Charge |
| Oil properties: | | | | | |
| Gravity, seconds, A.P.I. | 21.4 | 21.7 | 21.5 | 21.9 | 20.5 |
| SUV at 210° F | 149.2 | 140.9 | 147.9 | 116.7 | 172.7 |
| Neutralization number | 0.15 | 0.02 | 0.35 | 0.06 | 5.7 |
| ASTM steam emulsion number | 800 | 35 | 1,200+ | 1,200+ | 1,200+ |
| Flash point, ° F | 530 | 505 | 530 | 370 | 535 |
| Color, ASTM | 7 | 5+ | 8 | 8 | Black |
| Color, Lovibond (500 amber series) | 141 | | 200 | | |
| Sulfur, percent | 0.3 | 0.3 | 0.3 | | |
| Pour, 0° F | 35 | 35 | 35 | | |
| Carbon residue, percent weight | 0.6 | 0.6 | 0.7 | | |

From the above Tables II and III, it will be apparent that an oil decolorization process, when conducted in accordance with the method of this invention, requires substantially less adsorbent for treatment of a given amount of oil charge treated to specification than does the conventional fixed bed percolation process. Moreover, it will be noted that, in the examples given, the oil throughput capacity per unit of treater volume or cross-section was about ten times higher for the operation in accordance with the method of this invention than was possible with fixed bed operation. This means, in the case of these examples, that by employing the method of this invention, there results a reduction in treating zone volume of about 75 to 95 percent for the same amount of oil treated. This means a very large reduction in the amount of percolation apparatus volume. Similarly, operation in accordance with the method of this invention makes possible a very large increase in liquid throughput capacity as compared to continuous percolation operations in which the columnar mass is maintained in compacted condition. For example, under the conditions of Example A in Table I, the actual superficial velocity of the oil through the treating zone was of the order of seven times the maximum velocity attainable with the columnar mass in compacted condition.

It will be further noted that, in the fixed bed percolation process, in order to provide rates of oil throughput through the percolation towers which are at least practical, it is often necessary, as shown in the examples, to dilute the oil feed with a viscosity cutting agent, such as a naphtha. This, of course, not only reduces the volume of oil present in the percolation towers, but also gives rise to a considerable heating cost in recovery of oil product from the diluent. In the process of this invention, the use of diluents in the oil feed is unnecessary and is usually undesirable. Hence, as indicated in the tables, the total solvent recovery cost including recovery from product and from oil washed from the clay in the washing step may amount in the conventional fixed bed percolation process to more than ten times the total solvent recovery cost in the process of this invention.

In a further example of the application of this invention, the method of operation herein disclosed may be advantageously applied to both the process of refining sugar by contact of raw sugar solution with 16–20 mesh bone char and to the process of revivifying the bone char by washing with water. Prior art processes for refining sugar and revivifying bone char are described in "Adsorption," by C. L. Mantell, First Edition, McGraw-Hill Book Company, Inc., 1945, at pages 102 to 106. In the application of the present invention to these processes the sugar solution is treated and the bone char is recovered in an apparatus and method system analogous to that described in detail hereinabove for decolorization of lubricating oils and washing of the spent adsorbent. In still another example, the new high capacity method for true countercurrent contacting of liquids and solid particles may be applied to treatment of water, heat transfer oils, molten salts or other heat transfer fluids for the purpose of heating or cooling such fluids by means of heat-carrying or heat-absorbing solid particles. The solid material, which is countercurrently contacted in the mildly expanded phase described herein with the heat transfer liquid, may be comprised of refractory or metal particles of high sensible heat content which are not internally wetted by the heat transfer liquid, such as steel or alloy balls.

It should be understood that the specific examples of operating conditions, apparatus arrangement and applications of this invention are exemplary in character and are not to be construed as limiting the scope of the invention thereto.

What is claimed is:

1. In a process for contacting liquids and subdivided solids in order to bring about a change in the condition of at least one of the materials contacted, wherein a liquid having a viscosity under contacting conditions within the range of about 0.2 to 500 centipoises is passed in a confined contacting zone upwardly through a columnar mass of downwardly moving solids of palpable, particulate form, made up essentially of particles falling within the size range of about 0.0058 to 0.185 inch average diameter and within the loose packed apparent density range of about 0.45 to 1.3 grams per cubic centimeter, and contacted liquid is withdrawn from the upper section of said zone, and contacted solid particles are withdrawn from the lower section of said zone, while the columnar mass is replenished with solid particles introduced into the upper section of said zone, the improved method in combination therewith for effecting truly countercurrent contacting which comprises; controlling the flow rate and viscosity of the liquid passing upwardly through said columnar mass of downwardly moving particles in excess of that which first causes a pressure drop per given units of columnar mass height and cross-section, due to flow of liquid through the mass of downwardly moving particles, equal to the difference between the weight of the wetted particles and the weight of the volume of liquid displaced by the wetted particles per the same units of columnar mass height and cross-section, where the pressure drop, columnar mass height and cross-section and weights of liquid and wetted solids are expressed in consistent units, whereby substantially all of the particles are essentially suspended in the liquid in the sense that any such particle is essentially unsupported by surrounding particles, further controlling the flow rate and viscosity of said liquid to limit the expansion of said columnar mass to an extent that essentially all of such suspended particles are surrounded sufficiently closely by other such particles to prevent escape from their regions of confinement by surrounding particles, at least one of the flow rate and viscosity of the liquid being increased, whenever necessary, to maintain said particles essentially suspended in said liquid and being decreased, whenever necessary, to limit the expansion of said columnar mass below that at which the individual particles would be free to escape from their regions of confinement by other particles, the volumetric expansion of said columnar mass being limited in any case below about 30 percent of the normally settled volume of the oil-wetted mass.

2. The method of claim 1 characterized in that said liquid is an oil having a viscosity within the contacting zone in the range of 0.2 to 500 centipoises and said solids are made up essentially of adsorbent particles, the average diameter of which exceeds about 0.01 inch, the oil being treated with said adsorbent to effect removal of small amounts of impurities therefrom and the ratio of adsorbent relative to oil throughput on the weight basis is controlled within the range of about 0.5 to 50.

3. The method of claim 1 further characterized in that the viscosity of the liquid within said contacting zone is controlled solely by regulating its temperature.

4. In a continuous method for contacting liquids and solids in order to bring about a change in the condition of at least one of the materials contacted, wherein a liquid having a viscosity under the contacting conditions within the range of 0.2 to 500 centipoises is passed upwardly in a confined contacting zone through a columnar mass of downwardly moving solids of palpable, particulate form, made up essentially of particles falling within the size range of 0.0058 to 0.185 inch average diameter and having a loose packed apparent density within the range of about 0.45 to 1.3 grams per cubic centimeter, and contacted liquids and solids are withdrawn from the upper and lower sections of said contacting zone, respectively, while the columnar mass is replenished with solids at its upper end, the improvement in combination therewith which comprises; controlling the rate of flow and viscosity of the liquid passing upwardly through said columnar mass of downwardly moving solid particles to maintain their combined effect on pressure drop due to the liquid flow through the columnar mass of downwardly moving particles in excess of that which first causes a pressure drop per given units of columnar mass height and cross-section due to flow of liquid through the mass of downwardly moving particles equal to the difference between the weight of the wetted particles and the weight of the volume of liquid displaced by the wetted particles per the same units of columnar mass height and cross-section, where the pressure drop, columnar mass height and cross-section and the weights of liquid and wetted solids are expressed in consistent units, whereby substantially all of said particles are essentially suspended in the liquid in the sense that any such suspended particle is unsupported by surrounding particles, and further controlling the flow rate and viscosity of said liquid to limit volumetric expansion of said columnar mass below that at which the particles would become so separated as to permit escape of individual particles from their regions of confinement by surrounding particles, said expansion being limited in any case below about 30 percent of the normally settled volume of the columnar mass of wetted particles, and said rate of flow and viscosity of said liquid being further controlled in all cases to maintain their product, ZU, less than the value:

$$2 \ (0 \ D^2\left(\frac{S_a}{1-F}\right)\left(1-\frac{S_L}{S_T}\right)-V_s FZ$$

where Z is the liquid viscosity in centipoises and $S_L$ the density in grams per cubic centimeter, respectively, of the liquid under the conditions of the contacting zone, U is the superficial velocity of the liquid flow through the portion of the contacting zone occupied by the columnar mass in feet per hour, D is the average diameter of the solid particles in inches, $S_a$ and $S_T$ are the apparent density of the loose-packed, dry solids and the true density of the solid material, respectively, in grams per cubic centimeter, F is the fraction of voids between the adsorbent particles under the same mass conditions as $S_a$, $V_S$ is the superficial velocity of the solids measured under conditions $S_a$ in feet per hour; at least one of the flow rate and viscosity of the liquid being increased, whenever necessary, to maintain said particles essentially suspended in said liquid and being decreased, whenever necessary, to limit the expansion of said columnar mass below that at which the individual particles would be free to escape from their regions of confinement by other particles.

5. The method of claim 4 characterized in that the average diameter of said particles of solids exceeds about 0.01 inch, the apparent density of the loose-packed solids is within the range of about 0.45 to 1.3 grams per cubic centimeter, the fraction of voids under the loose-packed density conditions is within the range of about 0.4 to 0.55 and the superficial velocity of the liquid exceeds about 1.5 feet per hour.

6. The method according to claim 4 characterized in that said liquid is an oil and said solid particles are adsorbent particles, the oil being contacted with the adsorbent to effect removal of small amounts of impurities from said oil, the ratio of adsorbent relative to oil throughput on the weight basis is controlled within the range of about 0.5 to 50, the superficial velocity of said oil is further controlled within the range of about 0.5 to 20 feet per hour, the average diameter of said particles of adsorbent exceeds about 0.01 inch, the apparent density of the loose-packed adsorbent is within the range of about 0.45 to 1.3 grams per cubic centimeter and the fraction of voids under the loose-packed density conditions is within the range of about 0.4 to 0.55.

7. In a method for contacting liquids and solids in order to bring about a change in the condition of at least one of the materials contacted, wherein a liquid having a viscosity under contacting conditions within the range of about 0.2 to 500 centipoises is passed upwardly in a confined contacting zone through a columnar mass of downwardly moving solids of palpable, particulate form, made up essentially of particles falling within the size range of about 0.0058 to 0.185 inch average diameter, the liquid being substantially uniformly distributed into the lower section of said columnar mass prior to passage upwardly therethrough and contacted liquid being withdrawn from the upper section of said contacting zone, the contacted solids being withdrawn from the lower section of said contacting zone at a controlled, restricted rate and said columnar mass being replenished with fresh solids at its upper end, the improvement in combination therewith which comprises; controlling the rate of flow and viscosity of the liquid passing upwardly through said columnar mass of downwardly moving solid particles to maintain their combined effect on pressure drop due to the liquid flow through the columnar mass of downwardly moving particles in excess of that which first causes a pressure drop per given units of columnar mass height and cross-section, due to flow of liquid through the mass of downwardly moving particles, equal to the difference between the weight of the wetted particles and the weight of the volume of liquid displaced by the wetted particles per the same units of columnar mass height and cross-section, where the pressure drop, columnar mass height and cross-section and weights of liquid and wetted solids are expressed in consistent units, whereby said columnar mass is maintained in a mildly expanded condition in which substantially all of said particles are suspended in the liquid in the sense that any such suspended particle is unsupported by surrounding particles; further controlling the rate of flow and viscosity of said liquid as required to maintain their combined effect on expansion of said columnar mass below that which would cause an expansion permitting substantial haphazard, irregular movement of the particles in the columnar mass; at least one of the flow rate and viscosity of the liquid being increased, whenever necessary, to maintain said particles essentially suspended in said liquid and being decreased, whenever necessary, to limit the expansion of said columnar mass below that at which substantial haphazard, irregular movement of the particles in the columnar mass would occur, the volumetric expansion of said columnar mass being limited in any case below about 30 percent of the normally settled volume of the oil-wetted mass.

8. In a process wherein liquids of higher than 5 centipoises at 70° F. viscosity are percolated, in order to effect treatment of said liquids to improve properties thereof, in a treating zone through a columnar mass of downwardly moving solids of palpable, particulate form, made up essentially of particles falling within the range of about 0.0058 to 0.185 inch average diameter, the viscosity of said liquid under the conditions in said percolation zone being less than about 500 centipoises, and the loose apparent density of said solids being within the range of about 0.45 to 1.3 grams per cubic centimeter, and the contacted liquid is withdrawn from the upper section of said zone and the contacted solids are withdrawn at a controlled, restricted rate from the lower section of said zone, while the columnar mass is replenished with solids in the upper section of said zone, the improved method in combination therewith for effecting high liquid throughput capacity, truly countercurrent contacting of the liquids and solids which comprises; substantially uniformly distributing the viscous liquid feed, without any solvent dilution, into a lower portion of said columnar mass and passing it upwardly therethrough at a superficial velocity in excess of about 0.5 foot per hour, while controlling the flow rate and viscosity of said liquid to maintain their combined effect on pressure drop due to the liquid flow through the columnar mass in excess of that minimum which first causes a pressure drop, per given units of columnar mass height and cross-section, due to the liquid flow upwardly through the columnar mass of downwardly moving particles, equal to the difference between the weight of the wetted particles and the liquid displaced by said particles per same units of columnar mass height and cross-section, where the pressure drop, columnar mass height and cross-section and weights of liquid and particles are expressed in consistent units, whereby said columnar mass is maintained in a mildly expanded condition in which substantially all of said particles are essentially suspended in the sense of being unsupported by surrounding particles, as contrasted with a compact column in which essentially every particle is supported by surrounding particles; further controlling the flow rate and viscosity of said liquid to limit the expansion of the columnar mass below about 30 percent of the normally settled volume of the columnar mass of wetted particles and to maintain the product of liquid flow rate and viscosity, ZU, in all cases less than the value:

$$250{,}000\, D^2\left(\frac{S_a}{1-F}\right)\left(1-\frac{S_L}{S_T}\right)-V_S F Z$$

where Z is the liquid viscosity in centipoises and $S_L$ the density in grams per cubic centimeter, respectively, of the liquid under the conditions of the contacting zone, U is the superficial velocity of the liquid flow through the portion of the contacting zone occupied by the columnar mass in feet per hour, D is the average diameter of the solid particles in inches, $S_a$ and $S_T$ are the apparent density of the loose packed, dry solids and the true density of the solid material, respectively, in grams per cubic centimeter, F is the fraction of voids between the adsorbent particles under the same mass conditions as $S_a$, $V_S$ is the superficial velocity of the solids measured under conditions $S_a$ in feet per hour; whereby the expansion of the columnar mass is so limited that essentially all of the liquid suspended particles are surrounded by other particles to an extent that they are forced to move consistently and uniformly downward through the contacting zone as contrasted with particles in a fluidized column in which particles are free to move haphazardly in all directions in the contacting zone; at least one of the flow rate and viscosity of the liquid being increased, whenever necessary, to maintain said particles in said liquid and being decreased, whenever necessary, to limit the expansion of said columnar mass below that at which the individual particles would be free to escape from their regions of confinement by other particles and, in any case, below 30 percent of the normally settled volume of the columnar mass of wetted particles; the stream viscosity being controlled by regulating its temperature at the required level, which is substantially above atmospheric temperature.

9. In a continuous process for removing small amounts of impurities from oils of low asphalt content having a viscosity in excess of about 5 centipoises at 70° F. by percolation through a columnar mass of adsorbent of palpable particulate form made up essentially of particles falling within the range of about 0.0058 to 0.185 inch average diameter, the viscosity of said oils under conditions of percolation being less than about 500 centipoises and the loose apparent density of said solids being within the range of about 0.04 to 1.3 grams per cubic centimeter, and wherein the adsorbent is passed downwardly through a confined treating zone countercurrently to the oil at a rate controlled to provide an adsorbent throughput relative to oil throughput on a weight basis within the range of about 0.5 to 50, the improvement in combination therewith which comprises substantially uniformly distributing said viscous oil without solvent dilution into the lower section of said treating zone and passing it upwardly through the columnar mass to effect transfer of the impurities from the oil to said adsorbent, controlling the rate of oil flow through said treating zone to maintain a superficial velocity at a practicable rate within the range about 0.5 to 20 feet per hour and controlling its viscosity in relation to its flow rate to maintain their combined effect on pressure drop due to the oil flow through the columnar mass in excess of that minimum which first causes a pressure drop per given units of columnar mass height and cross-section, due to the oil flow upwardly through the columnar mass of downwardly moving particles, equal to the difference between the weight of the wetted particles and the oil displaced by said particles per same units of columnar mass height and cross-section, where the pressure drop, columnar mass height and cross-section and weights of oil and particles are expressed in consistent units, whereby substantially all of said particles are essentially suspended in the sense of being unsupported by surrounding particles, further controlling the flow rate and viscosity of the oil to so limit the expansion of said columnar mass that substantially all of such suspended particles are confined by non-supporting, surrounding particles, which prevent escape of the particles from their respective regions of confinement by surrounding particles, whereby substantially all of the particles move consistently and uniformly downwardly through the treating zone in true countercurrent relationship to the oil, at least one of the flow rate and viscosity of the oil being increased, whenever necessary, to maintain said particles essentially suspended in said oil and being decreased, whenever necessary, to limit the expansion of said columnar mass below that at which the individual particles would be free to escape from their regions of confinement by surrounding particles, the volumetric expansion of said columnar mass being limited in any case below about 30 percent of the normally settled volume of the oil wetted mass, the viscosity of said oil being controlled within said zone solely by regulating its temperature, flowing spent adsorbent along with whatever oil flows therewith downwardly from the lower section of said treating zone as at least one elongated columnar stream, the rate of flow of which is controlled at a point a substantial distance down said stream from the treating zone, the sum total of horizontal, columnar, cross-sectional area for withdrawal of adsorbent from said treating zone as aforesaid being restricted to a minor fraction of that of the columnar mass in said treating zone, whereby the amount of entrained oil which passes downwardly with the columnar stream is restricted without the use of a solvent seal in the adsorbent withdrawal stream, withdrawing purified oil from the upper section of said treating zone, and replenishing the columnar mass with supply adsorbent at its upper end.

References Cited in the file of this patent

UNITED STATES PATENTS

| | | |
|---|---|---|
| 1,768,342 | Stratford | June 24, 1930 |
| 2,321,459 | Chenault et al. | June 8, 1943 |
| 2,632,720 | Perry | Mar. 24, 1953 |
| 2,696,305 | Slover | Dec. 7, 1954 |
| 2,701,786 | Evans et al. | Feb. 8, 1955 |
| 2,745,888 | Mertes et al. | May 15, 1956 |
| 2,850,438 | Bodkin et al. | Sept. 2, 1958 |
| 2,850,439 | Bodkin et al. | Sept. 2, 1958 |
| 2,904,506 | Penick | Sept. 15, 1959 |

OTHER REFERENCES

Wilhelm et al.: Chemical Engineering Progress, vol. 44, No. 3, March 1948, pages 201–218.

UNITED STATES PATENT OFFICE
CERTIFICATE OF CORRECTION

Patent No. 3,072,567

January 8, 1963

Louis P. Evans et al.

It is hereby certified that error appears in the above numbered patent requiring correction and that the said Letters Patent should read as corrected below.

Column 16, line 1, for "freezing" read -- treating --; column 20, lines 13 to 15, in the equation, left hand portion thereof, for "2 ( 0 $D^2$" read -- 250,000 $D^2$ --.

Signed and sealed this 1st day of October 1963.

(SEAL)
Attest:

ERNEST W. SWIDER

Attesting Officer

DAVID L. LADD

Commissioner of Patents